J. WALDES.
BUTTON.
APPLICATION FILED AUG. 1, 1919.
1,375,873.
Patented Apr. 26, 1921.
Fig. 1.
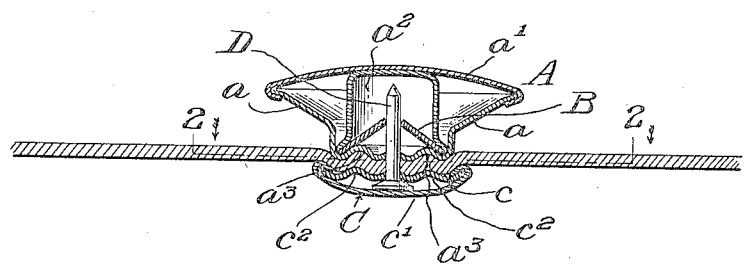
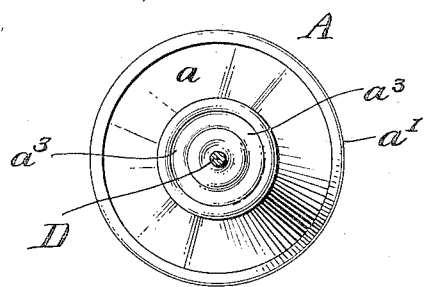
Fig. 2.
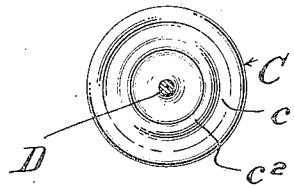
Fig. 3.
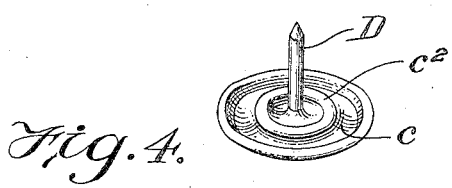
Fig. 4.
Inventor
Jindrich Waldes
By his Attorneys

UNITED STATES PATENT OFFICE.

JINDŘICH WALDES, OF PRAGUE, BOHEMIA.

BUTTON.

1,375,873.   Specification of Letters Patent.   Patented Apr. 26, 1921.

Application filed August 1, 1919. Serial No. 314,755.

*To all whom it may concern:*

Be it known that I, JINDŘICH WALDES, a citizen of the Czecho-Slovak Republic, residing at Prague, Bohemia, have invented certain new and useful Improvements in Buttons, of which the following is a specification.

This invention relates to buttons of the kind generally known as non-separable or bachelor buttons in which the head or shank members are so constructed that while they may be readily applied to the cloth and firmly connected with each other they cannot afterward be easily separated.

As usually constructed the head member is formed with a socket provided with a locking device, and the shank member consists of a base and a shank or spindle adapted to enter the socket and engage the locking device.

Although buttons of this kind are efficient and usually can be readily applied to the cloth it is nevertheless true that usually they do not grip the cloth closely or tightly and, therefore, are inclined to wabble on the cloth. According to my invention the two members of the button are so constructed that they tightly clamp the cloth and wabbling is prevented. To accomplish this, the two adjacent faces of the two members are grooved and ribbed in such manner that the cloth is pressed by the rib into the groove and is tightly clamped therein.

In the accompanying drawings:—

Figure 1 shows a section of a button embodying my improvements applied to a piece of cloth.

Fig. 2 is a sectional view on the line 2—2 of Fig. 1 looking upward.

Fig. 3 is a similar view looking in the opposite direction, *i. e.*, that indicated by the arrows in Fig. 1.

Fig. 4 is a perspective view of the shank member of the button.

The head or socket member A is preferably made of sheet metal, comprising a body portion $a$, a top portion $a'$ and an inner frame portion $a^2$. These parts may be of usual construction except that the under side of the body portion $a$ is formed with an annular groove $a^3$ surrounding the central opening of the socket member through which the shank D extends. The springs or locking devices B within the inner frame portion $a^2$ are of usual construction and operate in the usual way.

The shank member C consists of an inner base piece $c$ and an outer base piece $c'$. The head of the shank D is clamped between the parts $c$, $c'$ in the usual way. The shank member is of usual construction except that the inner part $c$ is formed with an annular rib $c^2$ corresponding with the groove $a^3$ on the socket member.

Ordinarily, as before stated, the opposing faces of the shank member and the socket member are flat and straight and are not usually brought close together so that the cloth is loose between the two members, but according to my invention, as shown in Fig. 1, the cloth is pressed by the rib of one member into the groove of the other member and is tightly clamped therein. It is obvious that the groove may be formed in either member and the rib produced in the other member, and one or more ribs and grooves may be provided.

I claim as my invention:—

1. A button, comprising a member having a shank and a base to which the shank is attached and which is grooved and ribbed on one side, and a socket member comprising a hollow body portion formed on its under side with grooves and ribs corresponding with those in the base of the shank member, said hollow socket member containing locking devices which permit the shank to be inserted in the hollow body to prevent its withdrawal therefrom when once engaged therewith.

2. A button, comprising a member having a shank and a base to which the shank is attached and which is grooved and ribbed on one side, and a socket member comprising a hollow body portion formed on its under side with a plurality of grooves and ribs corresponding with the grooves and ribs on the base of the shank member, said hollow socket member containing spring locking devices which yield to permit the shank member to be inserted in the hollow frame of the socket member to prevent its withdrawal therefrom when engaged by said locking devices, said grooved and ribbed portions of the two members being arranged to firmly grip an extended area of a fabric and thus hold the two members of the button tightly engaged therewith.

In testimony whereof, I have hereunto subscribed my name.

JINDŘICH WALDES.